US012723195B1

(12) United States Patent
Islam et al.

(10) Patent No.: US 12,723,195 B1
(45) Date of Patent: Sep. 1, 2026

(54) CTAB ASSISTED TITANIA QUANTUM DOTS AT LOW TEMPERATURE FOR OPTO-CHEMICAL SENSING

(71) Applicant: KING FAISAL UNIVERSITY, Al-Ahsa (SA)

(72) Inventors: Shumaila Islam, Al-Ahsa (SA); Adil Alshoaibi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 19/430,942

(22) Filed: Dec. 23, 2025

(51) Int. Cl.

| | |
|---|---|
| ***C09K 11/02*** | (2006.01) |
| ***C01G 23/047*** | (2006.01) |
| ***C09K 11/06*** | (2006.01) |
| ***C09K 11/67*** | (2006.01) |
| *B82Y 20/00* | (2011.01) |
| *B82Y 40/00* | (2011.01) |

(52) U.S. Cl.
CPC ............ *C09K 11/06* (2013.01); *C01G 23/047* (2013.01); *B82Y 20/00* (2013.01); *B82Y 40/00* (2013.01); *C01P 2004/04* (2013.01); *C09K 2211/10* (2013.01)

(58) Field of Classification Search
CPC ....... C09K 11/02; C09K 11/025; C09K 11/08; C09K 11/67; C01G 23/047; C01G 23/053; B82Y 40/00
See application file for complete search history.

(56) References Cited

U.S. PATENT DOCUMENTS

| | | | | |
|---|---|---|---|---|
| 2007/0151482 | A1* | 7/2007 | Im | C01G 23/053 423/608 |
| 2008/0176212 | A1 | 7/2008 | Halas et al. | |
| 2011/0150753 | A1* | 6/2011 | Kim | B01J 37/033 423/610 |

FOREIGN PATENT DOCUMENTS

| | | | |
|---|---|---|---|
| CN | 104569074 | A | 4/2015 |
| CN | 106207118 | A | 12/2016 |
| CN | 109796043 | A | 5/2019 |
| CN | 112588283 | A | 4/2021 |
| IN | 201941008110 | | 9/2020 |

OTHER PUBLICATIONS

Machine translation of CN 109796043A (Year: 2019).*

* cited by examiner

*Primary Examiner* — Matthew E. Hoban
*Assistant Examiner* — Lynne Edmondson
(74) *Attorney, Agent, or Firm* — Nath, Goldberg & Meyer; Joshua B. Goldberg

(57) ABSTRACT

A method of synthesizing quantum dots includes adding titanium butoxide to isopropanol to obtain a first mixture. The method then includes adding distilled water to the first mixture to obtain a second mixture. The method then includes adding nitric acid to the second mixture to obtain a third mixture and stirring and heating the third mixture. The method then includes aging the third mixture at room temperature. The method further includes adding a cetyltrimethylammonium bromide (CTAB) solution to the third mixture to obtain a fourth mixture and stirring and treating the fourth mixture with heat to obtaining CTAB-$TiO_2$ Quantum Dots (QD) (C-titania QDs).

13 Claims, 3 Drawing Sheets

CTAB ASSISTED TITANIA QUANTUM DOTS AT LOW TEMPERATURE FOR OPTO-CHEMICAL SENSING

BACKGROUND

Field

The disclosure of the present Patent application relates to a method of synthesizing quantum dots, and more particularly titania quantum dot for use in opto-chemical sensing.

Description of Related Art

More than ever, optical chemical sensing is a thriving research field with a strong outlook in terms of future development and penetration into growing industrial markets. Optical sensors are growing in popularity due to the low-cost, low power requirements and long-term stability. They provide viable alternatives to electrode-based sensors or more complicated analytical instrumentation.

Thus, a method for synthesizing quantum dots is desired.

SUMMARY

The present disclosure relates generally to a method of synthesizing quantum dots at low temperature. The material presented herein can sense very acidic and basic media, ammonia, and samples with an unknown pH. The titania quantum dots may be used as a matrix to encapsulate indicator dyes or phenols. The titania quantum dots may be used for opto-chemical sensing because they have large surface area and pores which can encapsulate more phenol or dye species. The large surface area of the quantum dots may be beneficial for opto-chemical sensing.

In an embodiment, a method of synthesizing quantum dots includes: adding titanium butoxide to isopropanol to obtain a first mixture. The method may then include adding distilled water to the first mixture to obtain a second mixture. The method then includes adding nitric acid to the second mixture to obtain a third mixture and stirring and heating the third mixture. The method then includes aging the third mixture at room temperature. The method further includes adding a cetyltrimethylammonium bromide (CTAB) solution to the third mixture to obtain a fourth mixture and stirring and treating the fourth mixture with heat to obtain CTAB-$TiO_2$ Quantum Dots (QD) (C-titania QDs).

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
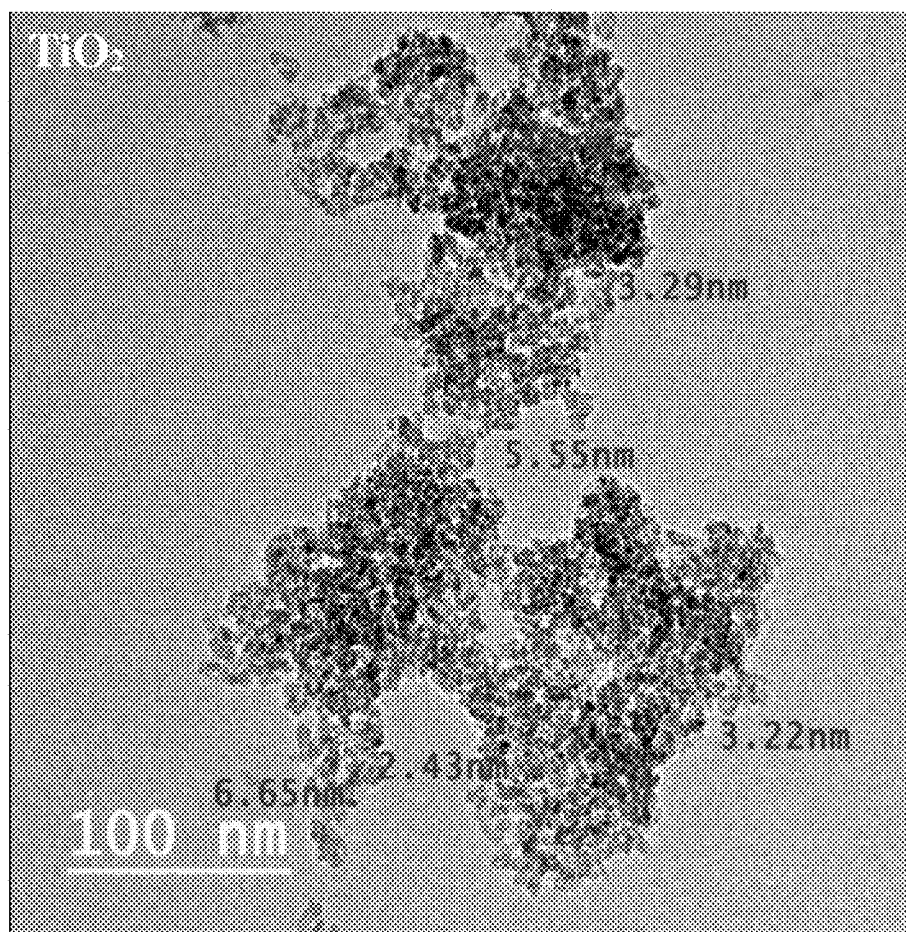
FIG. 1 shows a TEM analysis of $TiO_2$ nanoparticles as described herein.
Figure 2:
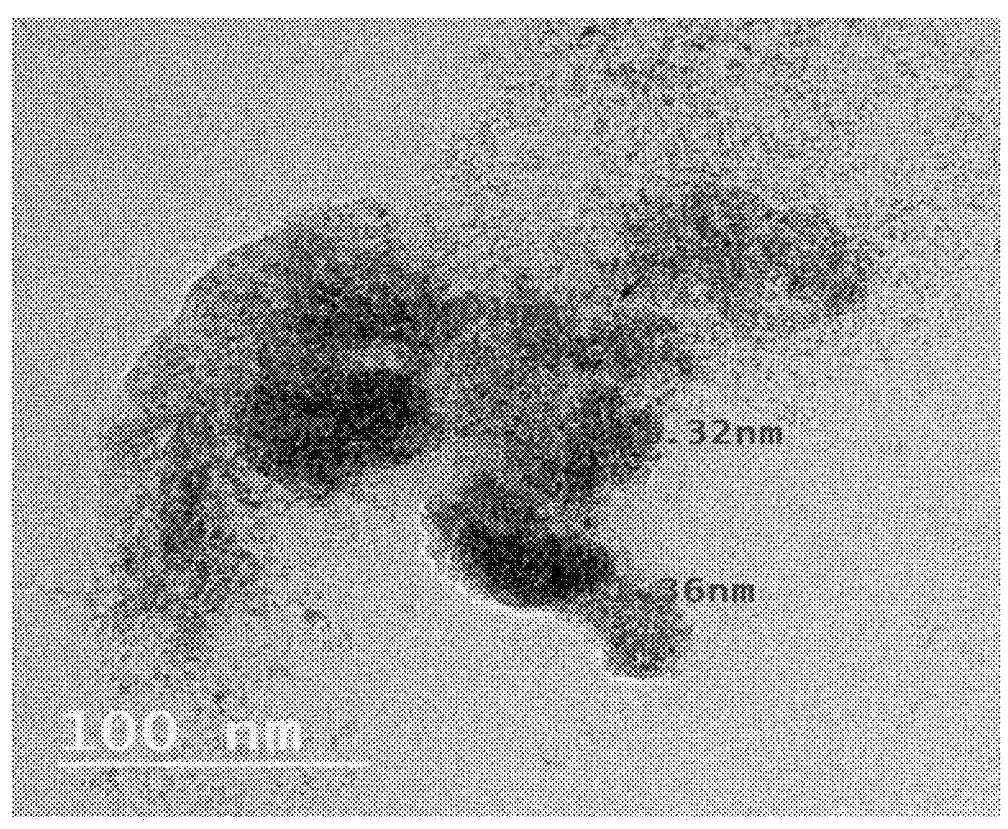
FIG. 2 shows a TEM analysis of (cetyltrimethylammonium bromide) CTAB-titania quantum dots (QDs) as described herein.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms “a”, “an”, and “the” include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms “include,” “includes”, “including,” “have,” “has,” or “having” should be generally understood as open-ended and non-limiting unless specifically stated otherwise.

The use of the singular herein includes the plural (and vice versa) unless specifically stated otherwise. In addition, where the use of the term “about” is before a quantitative value, the present teachings also include the specific quantitative value itself, unless specifically stated otherwise. As used herein, the term “about” refers to a ±10% variation from the nominal value unless otherwise indicated or inferred.

The term “optional” or “optionally” means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure relates to a method of synthesizing quantum dots at low temperature. The material presented herein can sense very acidic and basic media, ammonia, and samples with an unknown pH. The titania quantum dots may be used as a matrix to encapsulate indicator dyes or phenols. The titania quantum dots may be used for opto-chemical sensing because they have large surface area and pores which can encapsulate more phenol or dye species. The large surface area of the quantum dots may be beneficial for opto-chemical sensing. The CTAB-$TiO_2$ quantum dots described herein may have a size of about 0.96 nm to about 1.36 nm without graphene as sensor material.

In an embodiment, a method of synthesizing quantum dots may include adding titanium butoxide to isopropanol to obtain a first mixture. The method may then include adding distilled water to the first mixture to obtain a second mixture. The method may then include adding nitric acid to the second mixture to obtain a third mixture and stirring and heating the third mixture. The method may then include aging the third mixture at room temperature. The method further may include adding a cetyltrimethylammonium bromide (CTAB) solution to the third mixture to obtain a fourth mixture and stirring and treating the fourth mixture with heat to obtaining CTAB-$TiO_2$ Quantum Dots (QD) (C-titania QDs).

In various embodiments, 30 mL of the titanium butoxide may be added to 150 mL of the isopropanol under constant stirring.

In other embodiments, 150 mL of the distilled water may be added to the first mixture.

In still other embodiments, 15 mL of the nitric acid may be added to the second mixture.

Other embodiments may include heating and stirring of the third mixture may occur at about 60° C. to about 80° C. for at least about 3 hours, at least 3 hours, or about 3 hours.

In other embodiments, a pH of the third mixture may be about 1.

In an embodiment, aging the third mixture may last for at least about 2 days, about 2 days, and at least 2 days.

In various embodiments, the fourth mixture may be treated with heat for at least about 7 hours, at least 7 hours, or about 7 hours at a temperature of at least about 60° C. to about 80° C.

In other embodiments, the CTAB may have a concentration of 0.005M.

In still other embodiments, the C-titania QDs may have a size of at least about 0.96 nm to at least about 1.36 nm.

In various embodiments, the C-titania QDs may have a surface area of at least about 225 $m^2/g$.

In some embodiments, the concentration of the titanium butoxide may be 0.088 mol.

In still other embodiments, the nitric acid has a concentration of 3M.

The present disclosure also relates to an opto-chemical sensor using the C-titania QDs.

The present subject matter may be better understood by referring to the following Examples.

Example 1

Synthesis of C-Titania Quantum Dots $TiO_2$ nanoparticles were synthesized by mixing 30 mL of titanium butoxide (0.088 mol) into 150 mL of isopropanol under constant stirring at room temperature. The isopropanol was used purely as a solvent; therefore, no molar concentration is defined. It has a purity of 99+% and density of 0.80 g/mL from the supplier ACROS organics. Afterward, 150 mL of distilled water was added to the mixture followed by 15 mL of nitric acid (3M). The solution was stirred and heated for 3 hours at 60-80° C. The solution pH was kept to a value of 1. In FIG. 1, TEM analysis of the $TiO_2$ nanoparticles formed are shown.

For CTAB-$TiO_2$ QD (C-titania QDs) synthesis, after 2 days of room temperature aging, 20 mL of 0.005M concentrated CTAB solution was mixed into the $TiO_2$ nanoparticles solution under constant stirring. The solution was stirred and heat treated at 60-80° C. for 7 hours. As shown in FIG. 1, TEM analysis confirmed the size of the C-titania QDs in the range of 0.96 nm-1.36 nm. These C-titania QDs exhibited large surface area 225 $m^2/g$ by BET analysis.

Figure 3:
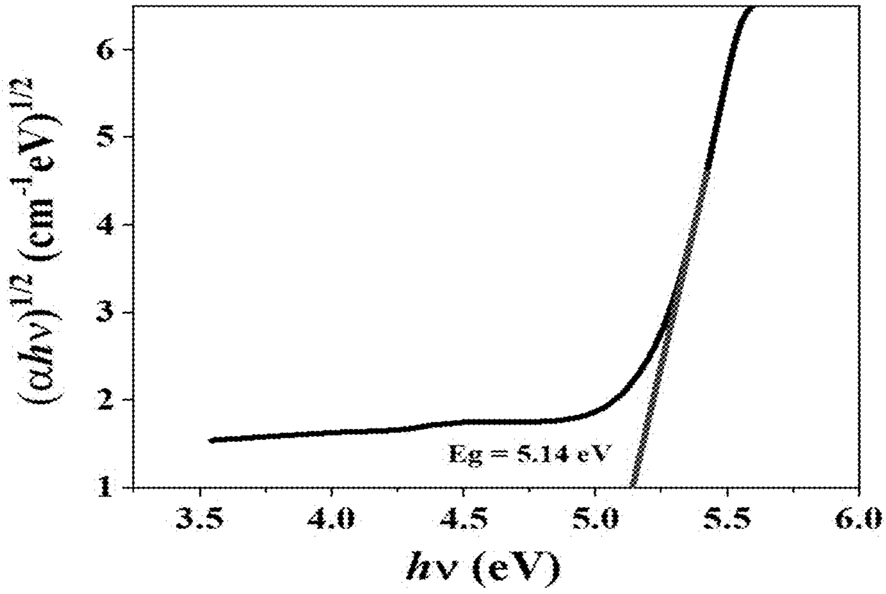
FIG. 3 shows a graph of Indirect bandgaps in C-titania QDs as described herein.
Figure 4:
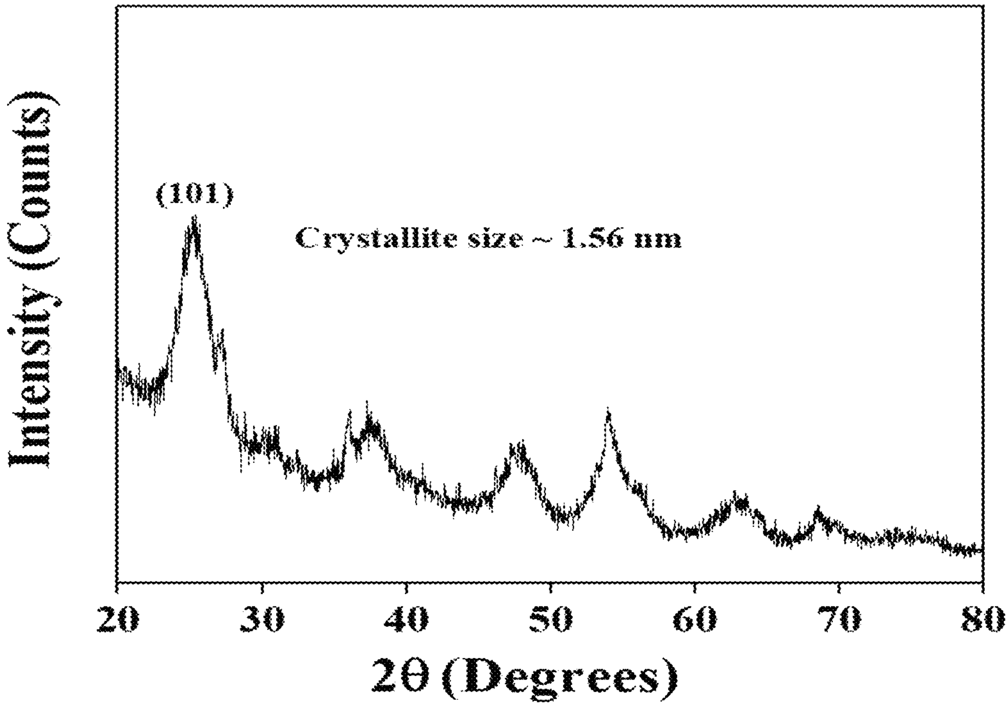
FIG. 4 shows XRD of C-titania QDs as described herein.

Typically, the various polymorphs of titania namely anatase, brookite, and rutile exhibit bandgap energies in the range of approximately 3.2-3.8 eV. In contrast, the synthesized CTAB-assisted titania quantum dots revealed a significantly wider indirect bandgap of about 5.14 eV [FIG. 3], indicative of pronounced quantum confinement effects due to their extremely small particle size. Furthermore, XRD analysis confirmed the formation of crystallites with an average size of ~1.56 nm, as determined from the (101) diffraction plane of titania anatase-phase [FIG. 4].

It is to be understood that the method of synthesizing quantum dots is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of synthesizing quantum dots, the method consisting of:

adding titanium butoxide to isopropanol to obtain a first mixture;

adding distilled water to the first mixture to obtain a second mixture;

adding nitric acid to the second mixture to obtain a third mixture;

stirring and heating the third mixture;

aging the third mixture at room temperature;

adding a cetyltrimethylammonium bromide (CTAB) solution to the third mixture to obtain a fourth mixture;

stirring and treating the fourth mixture with heat; and obtaining CTAB-TiO2 Quantum Dots (QD) (C-titania QDs), wherein the C-titania QDs have a size of about 0.96 nm to about 1.36 nm.

2. The method of claim 1, wherein 30 mL of the titanium butoxide is added to 150 mL of the isopropanol under constant stirring.

3. The method of claim 1, wherein 150 mL of the distilled water is added to the first mixture.

4. The method of claim 1, wherein 15 mL of the nitric acid is added to the second mixture.

5. The method of claim 1, wherein heating and stirring of the third mixture occurs at about 60° C. to about 80° C. for at least about 3 hours.

6. The method of claim 1, wherein a pH of the third mixture is measured at about 1.

7. The method of claim 1, wherein aging the third mixture lasts for at least about 2 days.

8. The method of claim 1, wherein the fourth mixture is treated with heat for at least about 7 hours at a temperature of at least about 60° C. to about 80° C.

9. The method of claim 1, wherein the CTAB has a concentration of 0.005M.

10. The method of claim 1, wherein the C-titania QDs have a surface area of at least about 225 $m^2/g$.

11. The method of claim 1, wherein the concentration of the titanium butoxide is 0.088 mol.

12. The method of claim 1, wherein the nitric acid has a concentration of 3M.

13. An opto-chemical sensor using the C-titania QDs of claim 1; wherein the C-titania QDs encapsulate a dye to aid in the detection of an analyte.

* * * * *